Oct. 9, 1956     F. H. WEBER     2,765,535
FISHING TACKLE HANDLE WITH BUILT-IN MEASURING TAPE
Filed Nov. 19, 1953
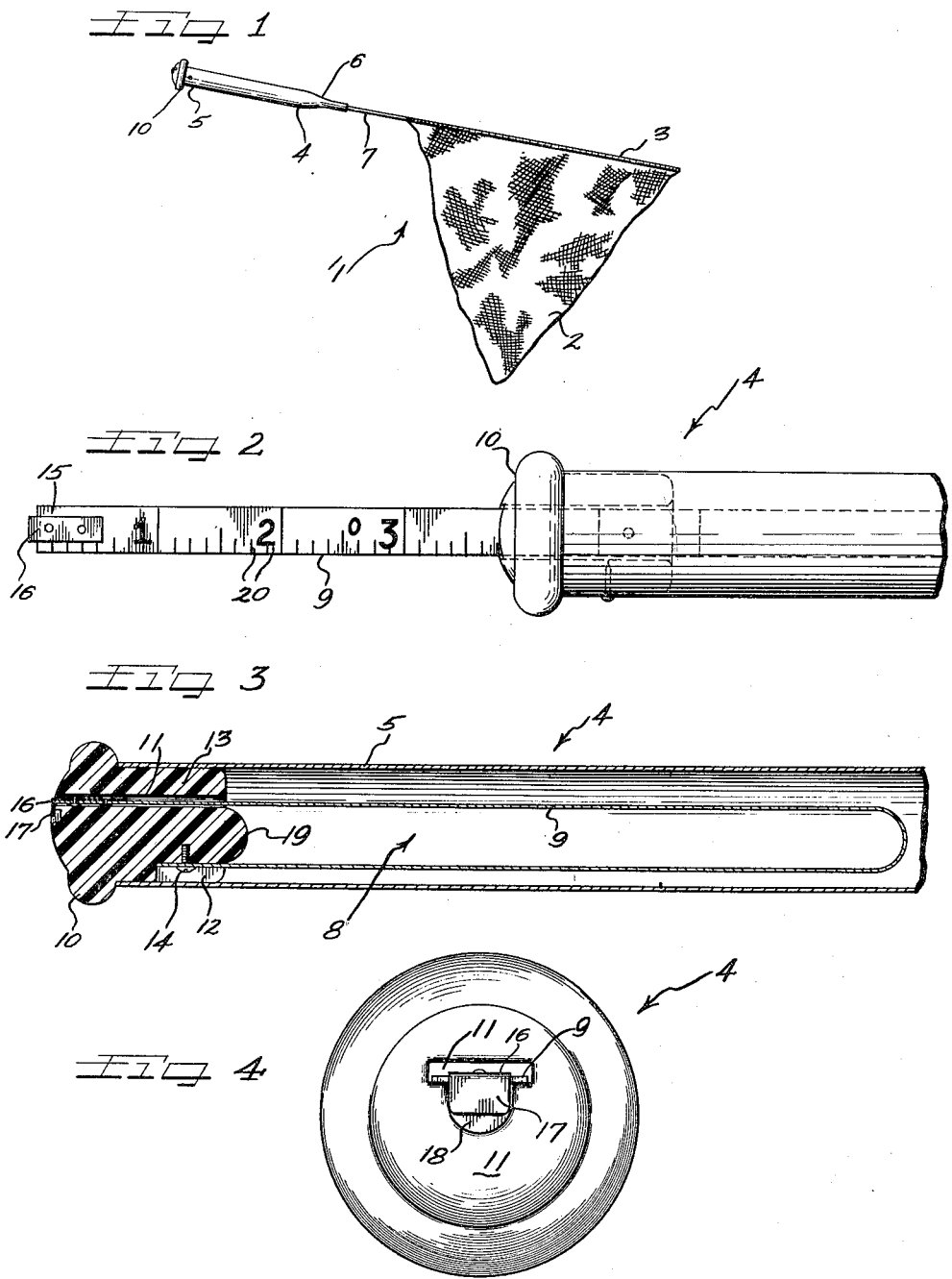
Inventor
Franklin H. Weber

United States Patent Office 2,765,535
Patented Oct. 9, 1956

2,765,535

FISHING TACKLE HANDLE WITH BUILT-IN MEASURING TAPE

Franklin H. Weber, Cicero, Ill.

Application November 19, 1953, Serial No. 393,192

1 Claim. (Cl. 33—137)

The present invention relates to an article of fishing tackle and more particularly relates to a fishing tackle article handle with built-in measuring tape.

Fishermen generally and fresh-water fishermen particularly are subject to enforced laws with regard to the permissible length of catch which may be kept. That is, state game laws particularly specify the minimum length of each species of fish which may be kept; all catches of less length than the specified minimum must be thrown back according to these game laws.

In view of these game laws, the sportsmen are effectively required to measure the length of each fish that they catch in order to determine whether it may be kept or if it must be thrown back. It, therefore, is important to anglers, and particularly fresh-water anglers who troll or cast or still fish or the like in the many lakes and rivers and streams, that they have readily handy convenient means for measuring their catch substantially precisely in order to make a quick determination of the legality of the catch. It is most desirable that the legality of the catch be determined immediately upon landing the same so that the small catch may be thrown back while still alive.

Heretofore, it has been the practice of these angling sportsmen to carry measuring devices either in their pockets or in their kits or the like or to mark one or another pieces of their tackle with units of measure thereon whereby to determine the length of each catch. Frequently, however, the measuring device became misplaced or the like or the marked article of tackle was not readily handy, thereby either inconveniencing the angler or forcing him to guess or estimate the length of the fish landed. In close cases, the estimates were quite unreliable and often the angler who had every desire to conduct his sport honestly kept fish which were below the legal length.

To prevent this unfortunate illegal activity and to provide anglers with a readily convenient measuring means so that they may conduct their sport as honestly as desired and in accordance with law, by the principles of the present invention there are provided handles for articles of fishing tackle having tape measures built in and in combination therewith.

It is, therefore, an important object of the present invention to provide articles of fishing tackle with new and improved handle means having readily convenient indicia marked on tape means built in and in combination therewith.

Another important object and feature of the present invention is to provide a new and improved handle structure for articles of fishing tackle having a substantially hollow grip end on the handle member and a retractible measuring tape or the like secured to the handle and housable therewithin.

Another object of the present invention is to provide a new and improved handle for a landing net or the like wherein the handle is formed from a substantially tubular member and provided with a closure plug at the free end thereof which provides a finishing and protective rim over the rear end edge of the tubular handle body and extends substantially radially outwardly therebeyond as a rear end stop against slippage of a user's hand from the handle body, and a push-pull measuring tape secured to the plug and retractible through a passage therethrough.

Still other objects, features and advantages of the present invention will become readily apparent from the following detailed description of the principles of the present invention and a preferred embodiment thereof, from the claim, and from the accompanying drawings in which there is illustrated, by way of example only, a preferred embodiment of the present invention, in which like reference numerals refer to like parts, and in which:

Figure 1 illustrates a landing net or the like having a handle thereon embodying the principles of the present invention;

Figure 2 is an enlarged fragmental view of the grip end and measuring tape;

Figure 3 is a longitudinal sectional view of this same embodiment of the present invention; and Figure 4 is an end elevational view of this preferred embodiment of the present invention.

Articles of fishing tackle such as the landing net 1 having a conical or otherwise bag shaped net or the like 2 carried by a supporting hoop or ring or the like 3, are usually conveniently provided with a handle 4 in firm association therewith for easy and convenient manipulation thereof. Such articles of fishing tackle as the landing net 1 are usually maintained in a convenient location for quick access by the angler while he is engaged in the identified sport. These articles are usually kept in a much more convenient and readily accessible place in proximity to the angler and are usually more clearly visible to him than any measuring means or the like which may be carried about his person or in his kit or tackle box or the like.

Therefore, there is provided in accordance with the principles of the present invention a new and improved handle for articles of fishing tackle, which handle has built into the same and in combination therewith a measuring element which is readily convenient and more readily accessible to the angler, thereby providing increased convenience to him in the conduct of his sport.

The handle 4 of the landing net 1 of Figure 1 is a handle which embodies the principles of the present invention and is more clearly illustrated and illustrated in greater detail in Figures 2, 3, and 4. It may be seen, however, in Figure 1 that the handle 4 has a grip end 5 and a hilt end 6, which latter end may be given any desired or convenient configuration such as tapering or the like for readily securing the same to the shank or the like 7 at the handle end of the landing net 1 or the like, which shank or the like 7 carries the remainder of the fishing tackle article and in the illustration of Figure 1 carries the ring or hoop or the like 3 by being formed integrally therewith or secured thereto.

The handle 4, in accordance with the principles of the present invention, is preferably hollow, as indicated generally at 8 (Figure 3), and may be formed from any desired material such as a substantially rigid and tubular material examples of which are metal or plastic or wood or the like, or the handle may be formed from a substantially solid member of these materials and hollowed as at 8 in the region of the grip end 5 thereof. By hollowing out the handle or the grip end region thereof, an elongated indicia marked member or element 9 may be carried therein retractably for convenient extraction from and reinsertion into the handle 4.

To this end, the elongated indicia marked member 9, which comprises a push-pull tape formed of any convenient flexible material such as sheet metal or fabric or plastic or flexible bonded mineral materials or the like, is secured to a plug 10 fixed closingly in the open end of the grip region 5 of the handle 4. It will be observed that on the outer end portion of the plug is provided a terminal continuous annular radially outwardly and protective rim over the edge of the handle body defining the rear opening therefrom and with the rim extending substantially radially outwardly therebeyond as a rear end stop against slippage of a user's hand from the handle body. A tape guiding passage 11 in the plug 10 and extending longitudinally therethrough and opening from the opposite ends thereof permits the measuring member 9 to be drawn outwardly therethrough from within the hollow 8 of the handle 4 and to be readily repositioned within the handle. The tape guiding passage 11 is spaced radially inwardly from the terminal rim flange of the plug 10 and leaves said rim flange peripherally uninterrupted, and thus free from undesirable edges or recesses, but smoothly continuous.

To retain the tape or strip 9 from being completely removed from the handle assembly 4, and to thus retain a small portion of the same within the hollow 8 of the grip end 5, one end of the tape or strip 9 is secured within a recess 12 of a substantially cylindrical shank portion 13 of the plug 10, the substantially cylindrical portion 13 being fitted into the extreme grip end of the handle assembly 4 by any convenient securing means such as a screw or the like 14. The recess 12 is located in the periphery of the plug shank 13 axially inwardly from the rim flange and opens through the inner end of the plug shank. At the leading or free outer end 15 of the elongated member 9 means is provided to prevent the tape from being pushed completely through the slot 11, to stop the end of the tape when it is recessed in the handle plug 10, and to provide convenient means for withdrawing the tape through the slot 11.

To this end, at the lead end of the tape, a hooked or flanged or lipped member 16 is secured to the tape by any convenient means such as bonding or riveting or the like. The member 16 preferably has a lip or flange or hooked end 17 (see Figures 3 and 4) of greater length than the thickness of the tape thereby to provide a convenient tape grip for pushing the tape or withdrawing the same.

In order that the hooked end 17 should not catch the anglers' clothes or lines or upon other pieces of tackle or the like, when the tape is recessed into the handle, a relatively small recess 18 is provided in the external butt end of the plug 11. The recess 18 is preferably slightly larger than the hooked end 17 on the tape grip member 16 so that the hooked end 17 may be readily fitted therein and conveniently withdrawn therefrom as by catching the same with a fingernail or the like to withdraw far enough to be grasped by the fingers.

The tape or strip 9 may have any convenient indicia markings 20 thereon such as unit measures of length or indications of legal length of catch for each species of fish, and the tape 9 preferably has a length substantially twice the length of the hollow 8 within the grip end 5 of the handle assembly 4 or substantially twice the length of the handle assembly 4 if the body thereof is formed from tubular stock as illustrated.

Thus, when a catch is made by the angler, his measuring tape is always readily convenient by virtue of its being disposed in and in combination with the handle of a convenient article of fishing tackle. Therefore, all that the angler need do is pull out the tape or withdraw the same from the handle and measure his catch. When withdrawing the tape, however, it is preferred not to sharply bend the tape since such tapes as steel tapes and the like may crease and break. In order to prevent such undesired creasing of the tape as may occur from withdrawing the tape forcefully to its full length and thereby bending the same about the plug 10 sharply, the plug is provided with an arcuate tape guiding and stop portion 19 between the recess 12 and the slot 11 at the inside end of the cylindrical section 13 of the plug. This arcuate portion 19 preferably has a width substantially the same as the width of the tape or the width of the slot in the plug and further is substantially semi-circular or the like so that the tape will smoothly bend or fold around the same without creasing.

Therefore, it will be observed that by the principles of the present invention there is provided a very economical, convenient and efficient assembly providing readily accessible indicia marked measuring means having most advantageous employment by anglers and such sportsmen.

By the compact unitary assembly of the closure plug member 10 and the tape member 9 wherein the tape is not only anchored at its inner extremity but at its outer or free end portion is held in the guide passage 11 against lateral or longitudinal escape from the plug, the plug and tape unit is quite convenient for mass production assembly handling and uniting thereof with the handle tube. The provision for anchoring the inner extremity of the tape within the peripheral recess in the plug shank affords a quick, easy-access anchoring expedient, which also facilitates assembly and low cost production.

It will also be observed that numerous variations and modifications and diverse embodiments of the present invention may be made without departing from the true spirit and scope of the novel concepts of the principles of my invention. I, therefore, intend to cover all such modifications and variations as fall within the true spirit and scope of the novel concepts of the principles of my invention.

I claim as my invention:

In a handle assembly for combination with an article of fishing tackle to conveniently carry and manipulate the same, a tubular handle body having an opening at the grip end extremity thereof, a plug closing the opening and having an elongated shank portion projecting into and filling the open end portion of the handle body with a terminal continuous annular radially outwardly projecting flange on the outer end portion of the plug overlying and affording a finishing and protective rim over the edge of the handle body defining the opening and extending substantially radially outwardly therebeyond as a rear end stop against slippage of a user's hand from the handle body, the plug having longitudinally therethrough and spaced radially inwardly from the terminal rim flange a tape guiding passage which opens through the opposite ends of the plug and leaves said rim flange peripherally uninterrupted, an elongated flexible indicia bearing push-pull measuring tape member extending through said passage with a manipulating free outer end portion extending from the outer end of the passage and with an opposite end portion inside the tubular body, said plug shank having a recess in the periphery thereof axially inwardly from said rim flange and opening through the inner end of the shank, and means anchoring the extremity of said inner end portion of the tape to the plug shank in said recess, the remainder of the tape between said outer and inner end portions being accommodated as a generally return-bent flexible loop within said handle body.

References Cited in the file of this patent

UNITED STATES PATENTS

| | | |
|---|---|---|
| 1,271,073 | Patten | July 2, 1918 |
| 1,522,280 | Strom | Jan. 6, 1925 |
| 2,003,893 | La Pan | June 4, 1935 |
| 2,602,999 | Reich | July 15, 1952 |